US005447059A

United States Patent [19]

Miller et al.

[11] Patent Number: 5,447,059

[45] Date of Patent: Sep. 5, 1995

[54] APPARATUS AND METHOD FOR DETERMINING GAS TURBINE ENGINE LIFE

[75] Inventors: Floyd D. Miller, Bonita; George L. Padgett, San Diego, both of Calif.

[73] Assignee: Solar Turbines Incorporated, San Diego, Calif.

[21] Appl. No.: 172,993

[22] Filed: Dec. 27, 1993

[51] Int. Cl.[6] .......... G01M 15/00

[52] U.S. Cl. .......... 73/116

[58] Field of Search .......... 73/116; 364/431.02; 374/142, 144

[56] References Cited

U.S. PATENT DOCUMENTS 3,237,448 3/1966 Howell et al. .......... 73/116
3,357,239 12/1967 Hohenberg .......... 73/116
3,362,217 1/1968 Evans et al. .......... 73/116
3,517,177 6/1970 Crowell .......... 235/183
3,527,086 9/1970 Evans et al. .......... 374/144
3,584,507 6/1971 Hohenberg .......... 73/116
3,950,985 4/1976 Buchwald et al. .......... 73/116
4,135,246 1/1979 McMannis .......... 364/551
5,042,295 8/1991 Seeley .......... 364/431.02

*Primary Examiner*—Robert Raevis
*Attorney, Agent, or Firm*—Alan J. Hickman

[57] ABSTRACT

An apparatus and method is provided for determining and recording the life and run values of a gas turbine engine. A starter drop out sensor and a turbine inlet temperature sensor delivers a respective drop out and turbine temperature signal. A receiving device receives the signals and advances the life recorder a predetermined amount based on a linear failure prediction curve for each completed turbine engine start in response to the turbine inlet temperature being greater than a set point value and the starter drop out signal being received. The receiving means also delivers a signal to enable advancement of the run recorder in response to the sensed turbine inlet temperature exceeding the set point value. A generating device delivers a signal to advance the life recorder an amount for the sensed turbine temperature based on a turbine life curve having turbine temperature to voltage coordinates.

20 Claims, 10 Drawing Sheets

APPARATUS AND METHOD FOR DETERMINING GAS TURBINE ENGINE LIFE

TECHNICAL FIELD

This invention relates to an apparatus and method for determining the equivalent life of a gas turbine engine and more particularly to an apparatus and method for determining the equivalent life of a gas turbine engine based on engine starts and turbine inlet temperature.

BACKGROUND ART

It has been known to provide an hour meter for a gas turbine engine. The hour meter simply displays a total number hours of operation of the gas turbine engine. This information is useful in providing information for establishing maintenance and overhaul schedules for each turbine engine model.

Because the hour meter does not display information which considers the duty cycle of the engine (firing temperature, number of starts, output, and the like) the frequency of maintenance and overhaul is often in error. Such error may result in excessive servicing on one hand or inadequate servicing on the other. In cases where excessive servicing is provided the cost of engine operation is increased. In situations where inadequate servicing is provided premature engine wear and failure may occur resulting in unnecessary down time.

The behavior of rotors, nozzles, blades, combustors, and other components of the turbine engine under various temperatures and stresses affect the life of the turbine engine. The alloy material used, for example, in the blades, nozzles, combustors and other components of the gas turbine engine affects the life of the gas turbine engine. This criteria has often been ignored during the establishment of the engine service schedule. Thus, inadequate servicing often results.

Since an hour meter display merely depicts the number of hours of operation of the gas turbine engine and does not consider factors related to the duty cycle, materials, and the like of a particular engine model and engine installation, there is inadequate information for a service technician to make an accurate judgement call related to the service requirements.

The manufacturer of the engine frequently provides a maintenance schedule to the user based on historical data. The schedule advises the user to service the engine at fixed periods of time. These service intervals include a safety factor. The safety factor considers that the engine is operating at a particular duty cycle. This may however not be the case and may result in too frequent service intervals.

Creep, low cycle fatigue, and temperature shock effects on gas turbine engines may lead to catastrophic turbine engine failure. These effects are not discernible through a reduction in the performance of the engine. However, such effects are predictable based on equations developed by analytical and empirical testing. Attempts have been made to determine engine life using techniques such as disclosed in U.S. Pat. No. 3,584,507 to Rudolph Hohenberg dated Jun. 15, 1971. This patent teaches sensing temperature (T7) and speed and determining creep, low cycle, and temperature shock fatigue based on these parameters and certain constants assigned to different engine models. This technique, although an improvement over the hour meter, is not complete as it does not consider all of the significant parameters, such as, a completed engine starting.

The present invention is directed to overcoming one or more of the problems as set forth above.

DISCLOSURE OF THE INVENTION

In one aspect of the present invention, an apparatus for determining the equivalent life of a gas turbine engine having a source of electrical energy and an electrical starting motor is provided. A temperature sensing means senses a temperature of the gas turbine engine and responsively delivers a first signal. A drop out sensing means senses starting motor drop out and delivers a responsive second signal. A recording means is provided for recording a value related to the equivalent life of the gas turbine engine. A means receives the first and second signals and changes the recorded equivalent life value a predetermined amount in response to receiving the second signal and in response to the sensed temperature being greater than a predetermined value. The receiving means is connected to the life recording, temperature sensing, and starting motor drop out sensing means.

In another aspect of the present invention, a method for determining the equivalent life of a gas turbine engine having a turbine inlet includes the steps of: sensing the inlet temperature of the turbine; calculating an equivalent life curve as a function of turbine inlet temperature; and advancing a life recorder a predetermined amount based on the equivalent life curve and the sensed turbine inlet temperature.

Being able to accurately determine, record, and display the life hour increments of a particular gas turbine engine model used up reduces or eliminates the error associated with the current methods of establishing maintenance and overhaul schedules. In particular, service and overhaul periods based solely on engine operating hours have been replaced by service and overhaul periods based on an accurate method of determining engine life. Therefore, waste associated with frequent service periods, based on a large safety factor, or premature wear and engine failure, resulting from an inadequate engine life safety factor, have been eliminated.

BEST MODE FOR CARRYING OUT THE INVENTION

Figure 1:
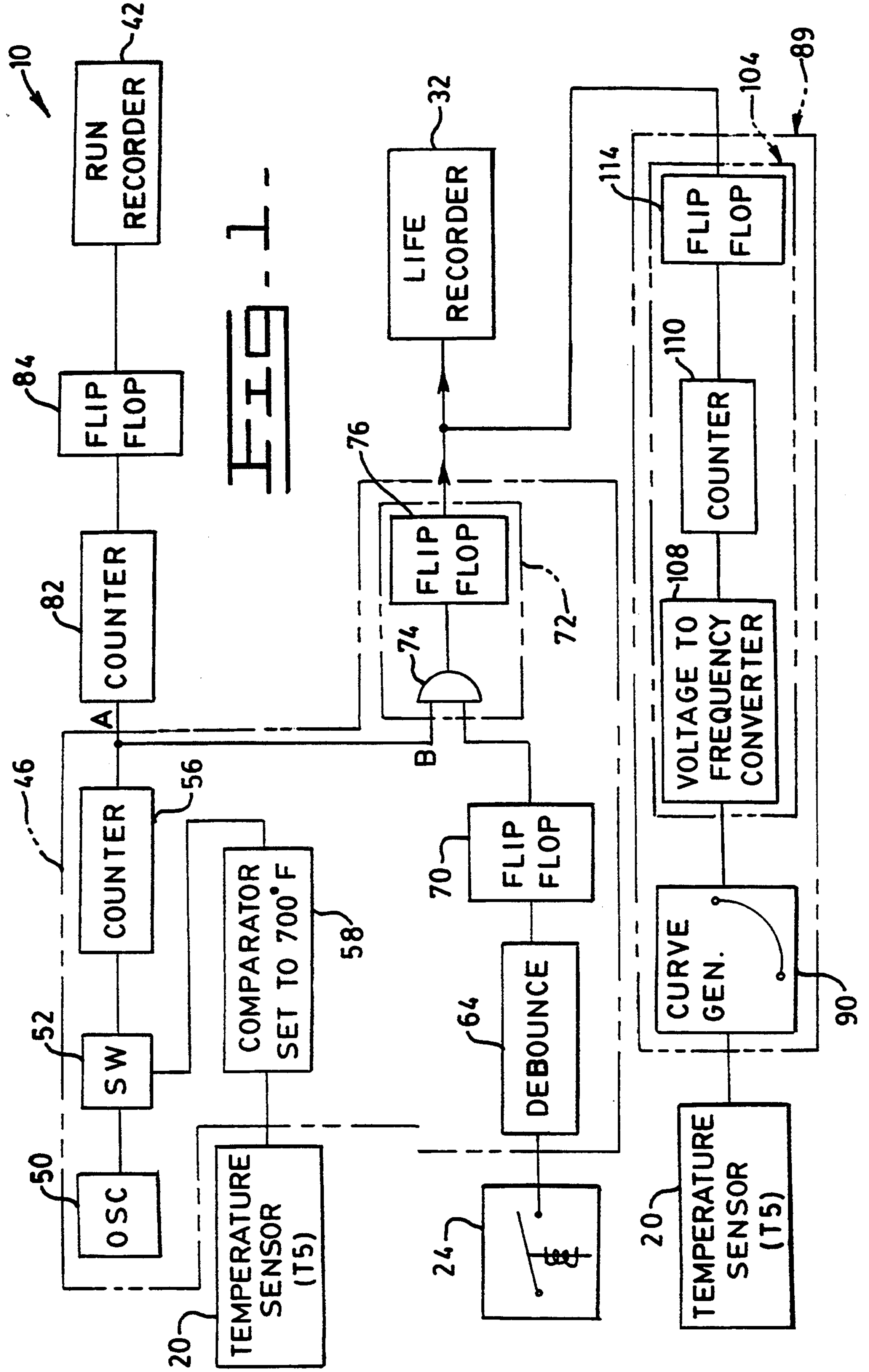
FIG. 1 is a diagrammatic block schematic circuit showing an embodiment of an apparatus of the present invention for determining the equivalent life of a gas turbine engine.
Figure 2:
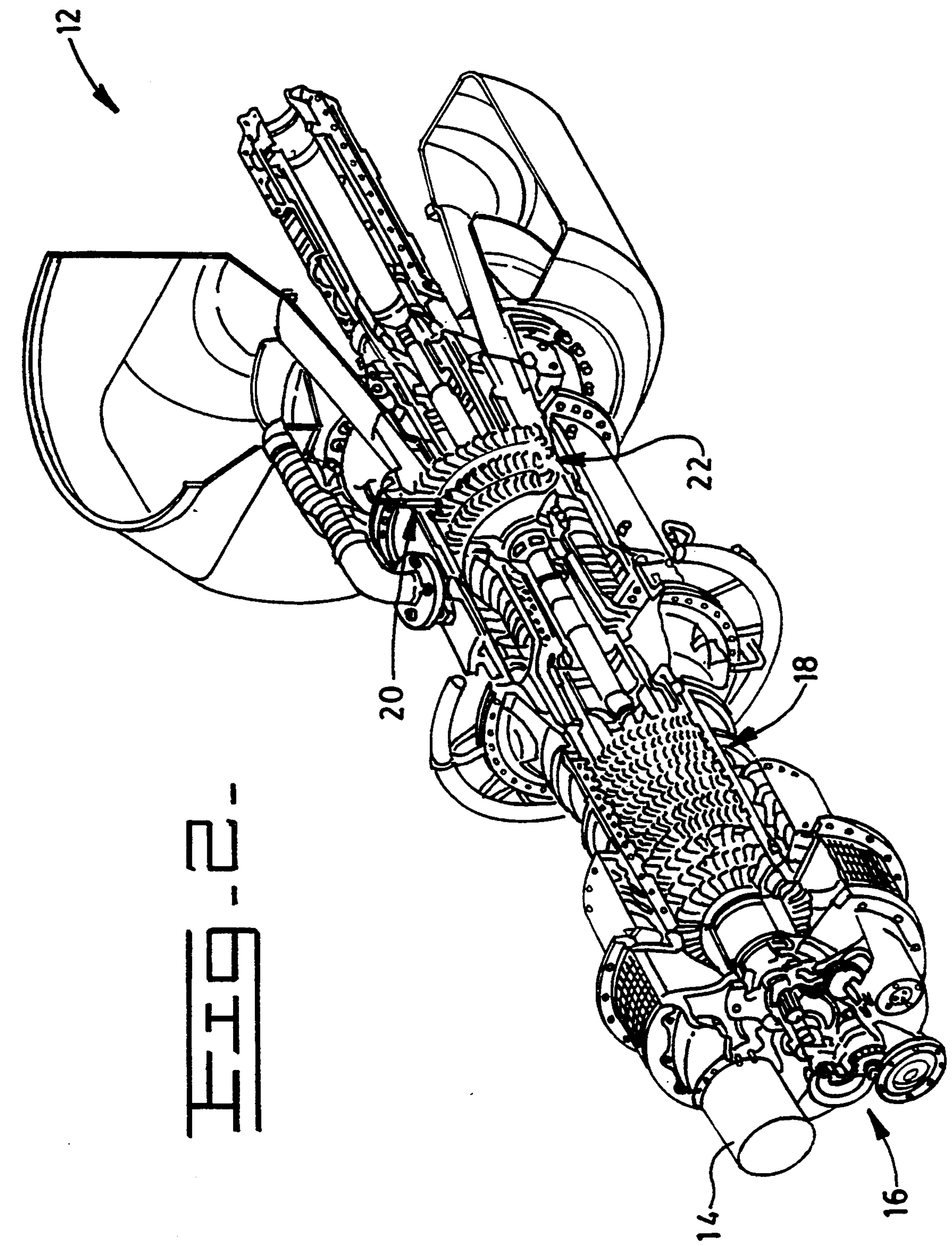
FIG. 2 is a diagrammatic isometric view of a gas turbine engine with portions broken away to show a power turbine inlet temperature sensor located at T5.
Figure 8:
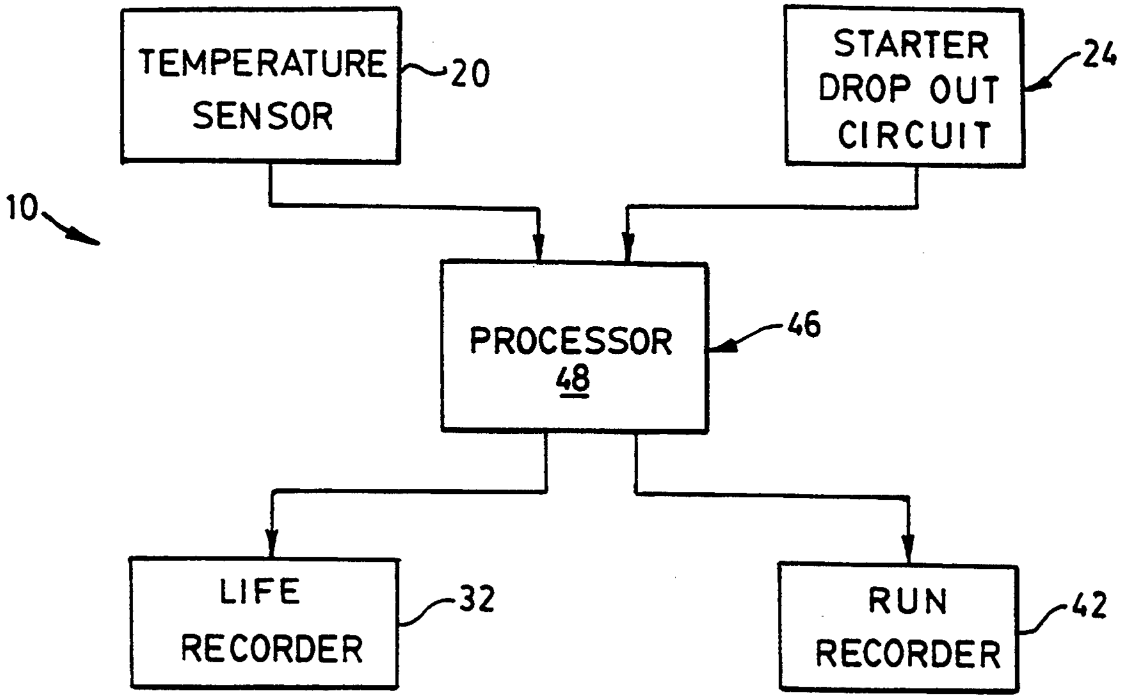
FIG. 8 is a diagrammatic block schematic of another embodiment of the present invention showing the apparatus of FIG. 1, as having a processor and various input and output hardware connected to the processor.

With reference to the drawings, and particularly FIGS. 1 and 2 and 8, an apparatus 10 is provided for determining the equivalent life and operating hours of a gas turbine engine 12. The apparatus 10 has a source of electrical energy, such as a battery (not shown), and an electrical starting motor 14. The starting motor 14 is drivingly connected to the compressor 18 of the gas turbine engine 12 via a transmission 16 and rotatable in response to the delivery of electrical energy from the source. An electrical starting switch (not shown) controls the operation of the starting motor 14. In one position of the starting switch the starting motor is enabled and drivingly rotates the compressor 18. In another position of the starting switch the driving motor is disabled from driving the compressor 18. In this context, starter drop out refers to disablement of the starting motor 14 in any suitable manner, for example, by disengaging a rotary output shaft of the starting motor with a drive train of the transmission 16, such as by actuating a clutch, moving a pinion gear of the output shaft, or other equivalent state of the art methods, and disconnecting the drive shaft from the transmission 16, or by disabling the starting circuit, such as by opening the starting switch and thus permitting freewheeling of the output shaft of the starting motor 14. It is to be recognized that there are other ways to achieve starter drop out. Such ways are considered equivalents and within the scope of the invention. It should be noted that starter drop out occurs in the embodiment of the invention disclosed herein when the compressor reaches a predetermined speed as sensed by a speed transducer of any suitable conventional design (not shown).

A sensing means 20 is provided for sensing the temperature ($T_5$) of the gas turbine engine 12 and responsively delivering a first signal. The temperature sensing means 20 includes a probe of any suitable well known construction which is preferably connected to the gas turbine engine 12 at an inlet location adjacent a turbine 22 so that the turbine inlet temperature is sensed. The temperature sensing means 20, in this embodiment, is positioned between the second and third stages of the turbine 22. It should be recognized that the exact location of the sensing means is dependent on the particular engine type, ie, single or two shaft engine.

Figure 6:
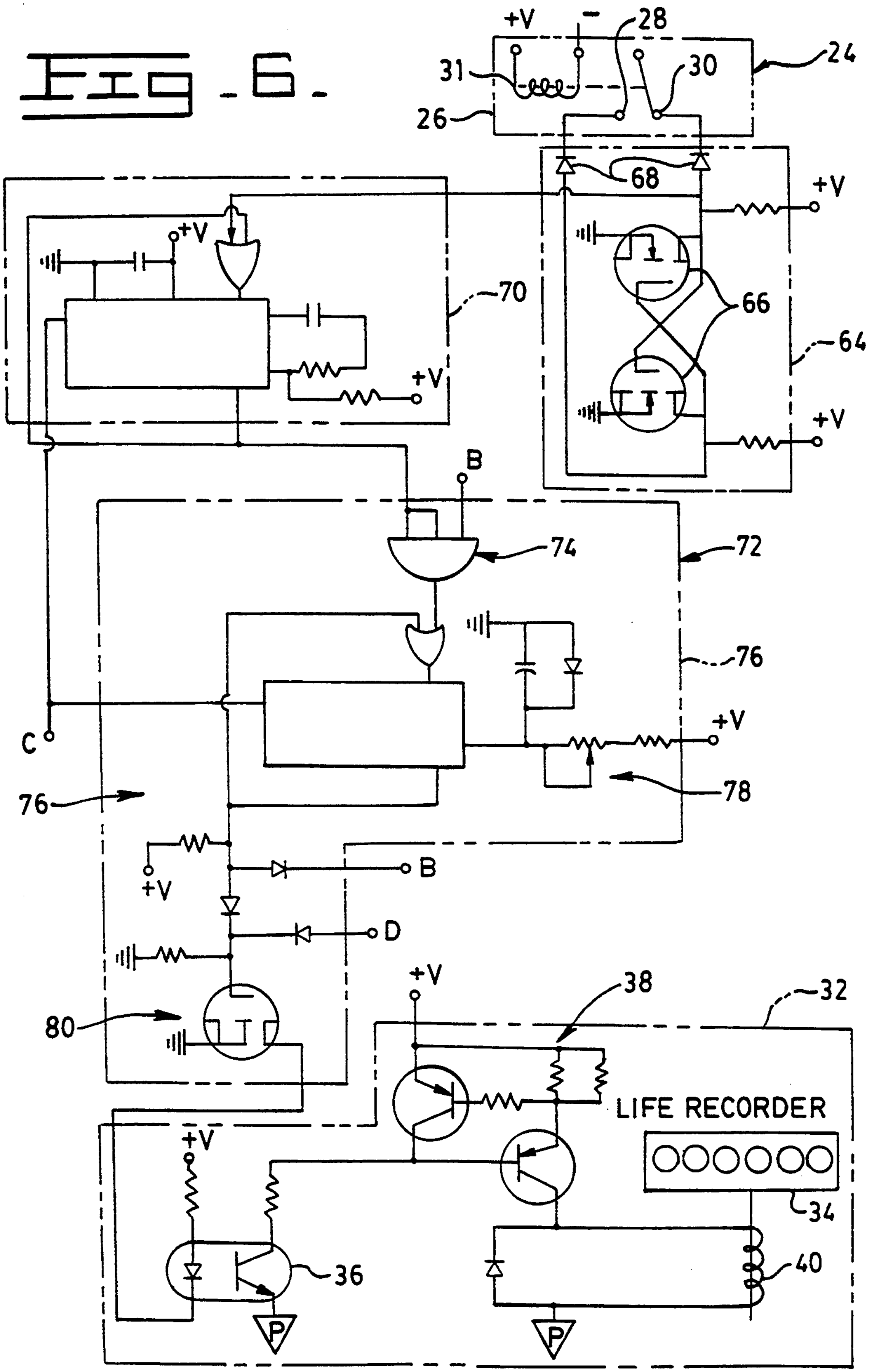
FIG. 6 is a diagrammatic electrical schematic circuit showing another portion of the apparatus of FIG. 1 in greater detail.

Referring to FIGS. 1, 2 and 6, a means 24 is provided for sensing the dropping out of the starting motor 14 and delivering a responsive second signal. As best seen in FIG. 6, the drop out sensing means 24 includes a relay 26 having first and second positions 28,30 and is movable between said first and second positions under the bias of coil 31. The coil 31 is responsive to the conditioned mode of the starting motor 14. The relay 26 is at the first position when the starter is enabled and at the second position when the starter is disabled or dropped out. The relay 26 delivers the second signal at its second position 30.

Referring to FIGS. 1 and 6 and 8, a means 32 is provided for recording a numerical value related to an equivalent life of the gas turbine engine 12. As best seen in FIG. 6, the life recording means 32 preferably includes a digital display 34 of the mechanical register type showing a numerical value in equivalent life hours. The digital display 34 has a photo transistor 36 which isolates the power grounds 38 from feeding back noise and the like to the transistorized circuit 38. The transistorized circuit controls current delivered to the digital display operating coil 40. It should be noted that the digital display 34 and transistorized circuit heretofore described may be replaced by other display devices and circuitry without departing from the spirit of the invention for example, by a liquid crystal display, light emitting diode display, cathode ray tube, laser or inkjet printer, and the like.

Figure 4:
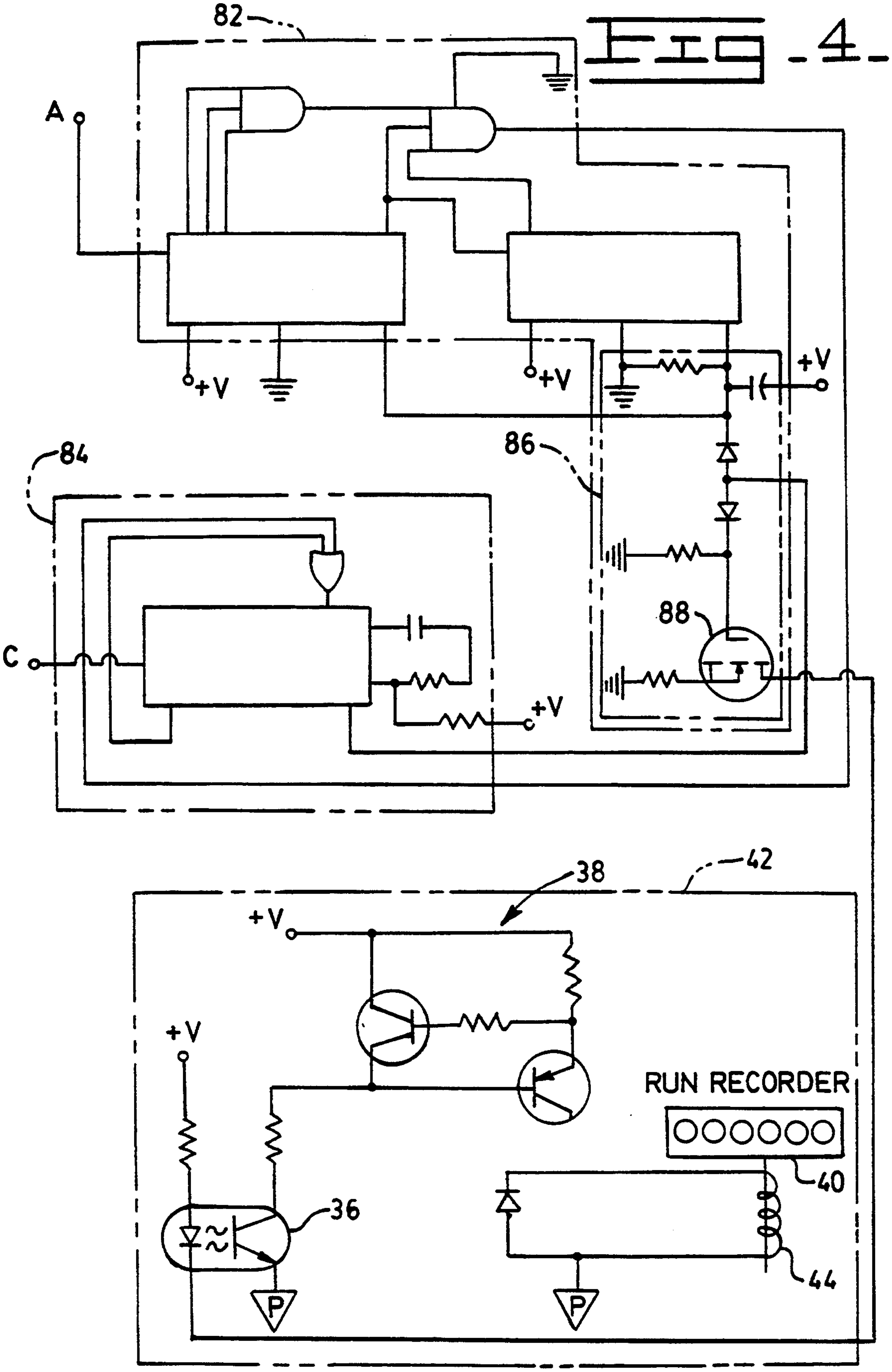
FIG. 4 is a diagrammatic electrical schematic circuit showing another portion of the apparatus of FIG. 1 in greater detail.

As shown in FIGS. 1,4, and 8, a means 42 is provided for recording a value related to the number of run units (preferably run hours) of the gas turbine engine 12. The run recording means 42 includes a digital display which is substantially identical in construction to that of the digital display 34 of the life recording means 32. Therefore, no further technical discussion will be provided. The components of the run recording means 42 identical to the components of the life recording means 32 have been identified by identical numerals.

As best seen in FIGS. 1 and 8, A means 46 receives the first and second signals from the temperature sensing means 20 and the drop out sensing means 24 and changes the recorded life value a predetermined amount for each completed gas turbine engine start. Each start is completed when the temperature being sensed is greater than a predetermined value and the starter has dropped out. The receiving means 46 is connected to the equivalent life value displaying means 32, the temperature sensing means 20, and the drop out sensing means 24. It is to be recognized that both the temperature and drop out conditions must exist in order to eliminate the potential for faulty start conditions. It has been determined that the speed and the temperature ($T_5$) must exceed a minimum value in order to advance the life recording means 32. The minimum limits are a function of the particular gas turbine engine 12 being monitored and vary from one engine type to another.

The predetermined amount of change of the numerical value of the equivalent life of the gas turbine engine for a single completed engine start is a function of at least a linear failure prediction constant based on the following equation:

$$\sum_{J=1}^{N} \sum_{i=1}^{K} \frac{t_i}{L_i} + \frac{C_J}{N_J} = 1$$

Where:

$t_i$=Time (elapsed running time) of exposure at $i_{tn}$ combination of stress (a function of measured turbine speed) and temperature.

$L_i$=Time required to rupture if the entire exposure were held constant at the $i_{tn}$ combination of stress level and temperature.

$C_j$=Number of cycles at stress level J.

$N_j$=Number of cycles to fail at stress level J.

N=Number of cycles to failure.

K=Number of intervals of time to failure.

Figure 11:
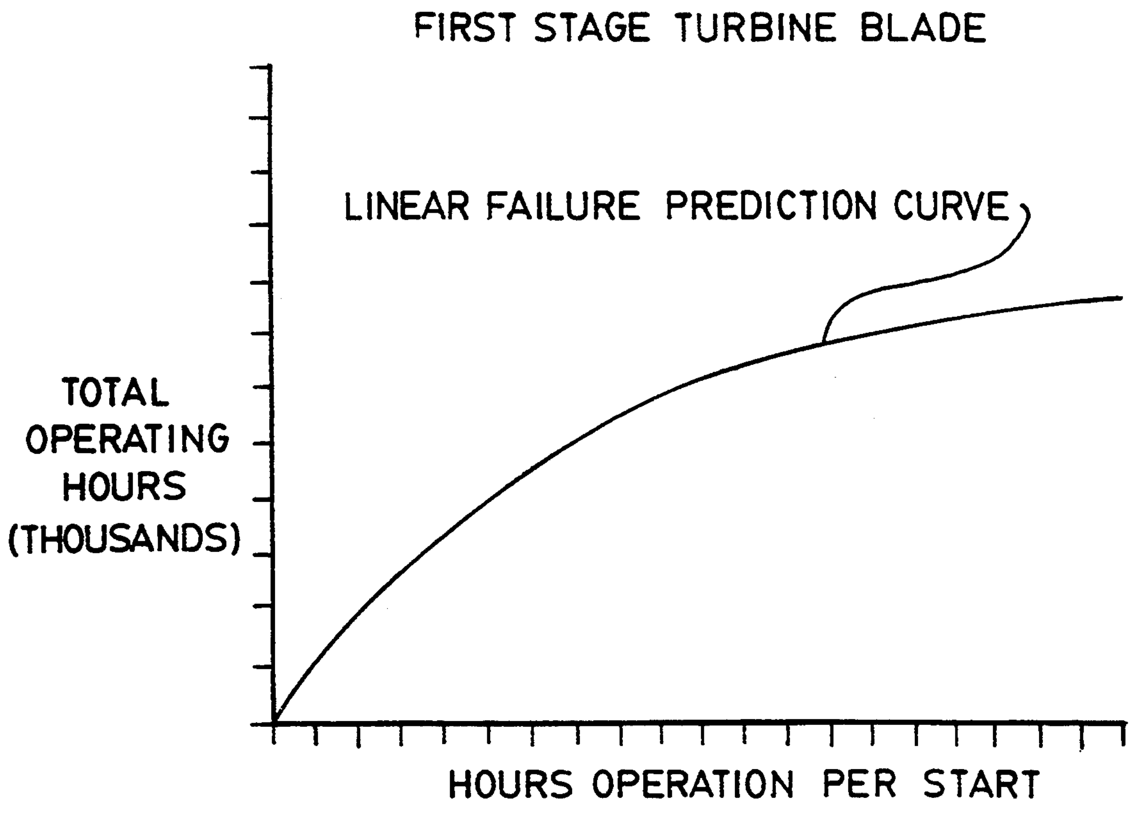
FIG. 11 shows a linear failure prediction curve for a turbine blade having the total number of operating hours plotted against hours of operation per start.

The linear relationship described by the above equation is based on evidence that creep and fatigue interact to produce a synergistic response. Assuming that each fatigue cycle is a start to full speed and load, then the life fraction used is simply a constant value C (rupture life) over N (cyclic life) depending on the particular turbine engine component of interest. For example, as determined by test results, a particular first stage turbine blade will permit 5200 starts to low cycle fatigue failure (negligible running time) and the gas turbine engine will run for 238,000 hours to first stage turbine blade rupture failure. Therefore, for a first stage turbine blade of a particular type one start is equal to a life fraction of 1/5200 while an hour's operation at design point temperature is 238000. Thus, a start is equivalent to 238000/5200=45.8 hours. The graph shown in FIG. 11, generated from data collected for the above mentioned first stage turbine blade, shows the effects of starts on expected life (rupture of turbine blade at 30% span). Thus, based on the components being considered as most critical for a given engine model, a life fraction C over N may be determined. Thus, for each start of the gas turbine engine, the recording means 32 is advanced a predetermined amount based on the life fraction C over N. The receiving means 46 which receives the first and second signals, changes the recorded numerical equivalent life value the predetermined calculated amount in response to receiving the second signal and in response to the sensed temperature being greater than the above-noted predetermined value.

Figure 3:
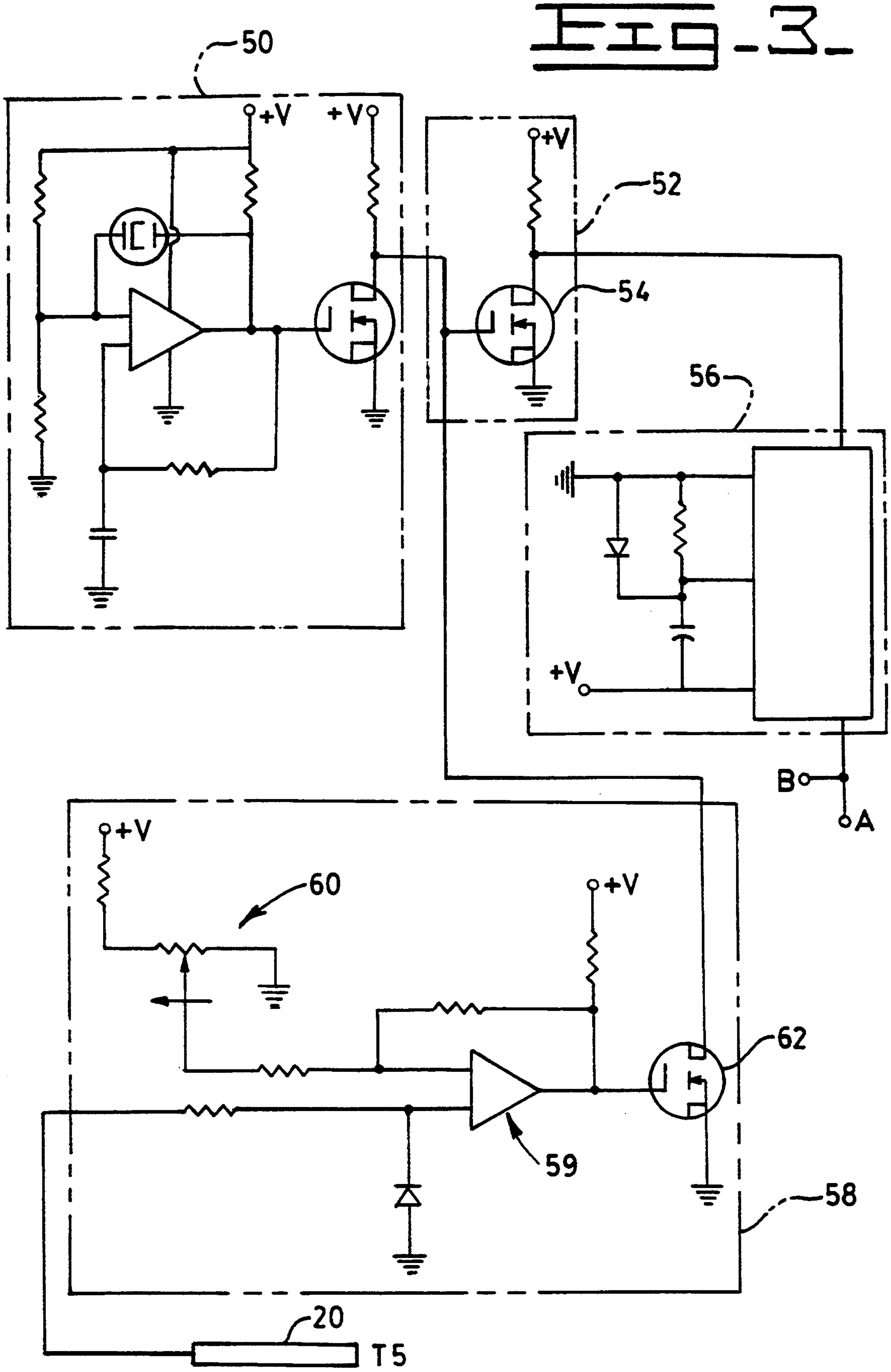
FIG. 3 is a diagrammatic electrical schematic circuit showing a portion of the apparatus of FIG. 1 in greater detail.

The receiving means 46, as shown in FIGS. 1, 3, and 6, includes an electronic circuit having a plurality of discrete electronic components connected to the temperature sensing means 20, drop out sensing means 24, and the life and run recording means 32, 42, respectively. The receiving means 46, as shown in FIG. 8, includes a processor 48, such as a programmable computer 48, an A/D converter (not shown) for converting the first and second signals, software for processing the received signals, and an output section (not shown) for delivering signals to the life and run recording means 32, 42, respectively.

Referring to FIGS. 1,3 and 6, the receiving means 46 includes a clock means 50, such as an oscillator of the RC type. The oscillator is connected to a DC source and delivers an output signal at a predetermined frequency to a switching means 52. The clock means 50 of this embodiment delivers a 20.48 KHz output signal.

The switching means 52 is connected to and between the clock and counting means 50,56 and movable between an open condition at which said oscillating signal is blocked and a closed condition at which said oscillating signal is deliverable to the counting means 56. The switching means 52 preferably includes a field effect transistor (FET) 54 having a gate connected to the clock means 50, a source connected to a counting means 56, and a drain connected to ground. The FET 54 turns on in response to the output signal from the clock means 50 going high. The counting means 56 responds to a signal delivered from the clock means 50 and divides the clock signal to produce a 10 Hz counter signal.

The temperature sensing means 20 (FIG. 3) delivers the first signal, a voltage signal, to a comparing means 58 having a comparator 59 connected to the temperature sensing means 20 and the switching means 52. The first delivered signal has a predetermined range of voltage values proportional to a predetermined range of temperature values. The comparator 59 also receives a voltage signal from an adjustment means 60, such as a potentiometer. The adjustment means 60 facilitates changing of a predetermined minimum voltage set value (threshold temperature) at which a control signal is deliverable by said comparing means 58. Thus, the comparing means 58 delivers a control signal in response to the first signal being greater than a predetermined value. A FET 62 has a gate connected to the output of the comparing means 58. A voltage source which is connected to the gate of the FET 54 is connected to the source of FET 62, and a drain of FET 62 is connected to ground. The FET 62 is turned on (closed) in response to receiving the output signal from the comparing means 58. The switching means 52 thus passes an oscillating signal to the counting means 56 when the comparing means 58 is delivering a control signal.

As best seen in FIGS. 1 and 6, the drop out sensing means 24 is connected to a debouncing means 64 consisting of a pair of transistors 66 having their gates connected to opposite terminals of the relay 26, their potential connected to the source, and a drain connected to ground. A pair of diodes 68 are connected to the gates of the transistors 66 and to the first and second terminals 28, 30 of the relay 24 as shown. The debouncing means 64 prevents contact bounce and detrimental arcing of the contacts of the relay 26 during starter dropout and thereby minimizes error in the delivery of the second signal and the counts based on the second signal. As a result the potential for delivering multiple second signals for a single starter drop out is prevented.

The second signal delivered in response to the sensing means 24 dropping out is passed to a flip flop 70. The flip flop 70 responds to the received second signal and delivers a signal (pulse) of a predetermined duration to a logic means 72 having an AND gate 74. In the particular embodiment the signal is a 90 millisecond pulse. The count signal from the counting means 56 is also delivered to the AND gate 74. The logic means 72 responds to receiving both signals and delivers a 10 Hz signal to a flip flop 76. The flip flop 76 responds to each 10 Hz signal and delivers a corresponding signal of a preselected duration based on the effective life used up for a completed turbine engine start. As indicated above, the effects of a start on the life of the gas turbine engine 12 is a function of the material, temperature of operation, and other design parameters. Thus, the duration of the signal delivered is proportional to the estimated amount of life used for a single engine start.

An adjustment means 78, such a potentiometer, is connected to the flip flop 76. The adjustment means 78 is provided for changing the pulse width and thus controlling the amount of life used for each start. Thus, a common apparatus 10 can be used for different gas turbine 12 models and types by simply changing the resistance value of adjustment means 78 to reflect the calculated life value change for the particular gas turbine engine model or type being considered.

The gate of a field effect transistor 80 is connected to the flip flop 76, the drain of transistor 80 is connected to ground, and the source of transistor 80 is connected to the phototransistor 36 of the life recording means 32. The phototransistor 36 responds to the signal delivered by the flip flop 76 and causes the life recording means 32 to advance the equivalent life recorder 32 the predetermined amount.

As best seen in FIGS. 1 and 4, the 10 Hz signal delivered from counting means 56 is passed to counting means 82 which delivers a count signal to a flip flop 84 to advance the run recorder 42 a predetermined amount. In the particular embodiment, the run recorder 42 is incremented one hour for each sequence of 36K pulses counted by counting means 82. The counting means 82 includes a reset means 86 for resetting the counter to zero (0) after the run recorder is incremented and the counting means 82 begins a new sequence of count. The flip flop 84 is connected to the gate of a field effect transistor 88 and controls advancement of the recording means by conditioning the transistor 88 to connect a current source of the phototransistor 36 of the run recorder 42 to ground. Since counting means 84 and reset means 86 are of a type well known in the art no additional description will be provided.

It should be noted that the run recorder 42 records the number of run hours of the gas turbine engine 12 for each hour of operation that the sensed temperature is greater than the predetermined set value.

Referring to FIG. 1, a generating means 89 is provided for receiving the first signal and changing the recorded numerical equivalent life value based on a predetermined turbine equivalent life curve having a numerical equivalent life value as a function of turbine inlet temperature.

Figure 5:
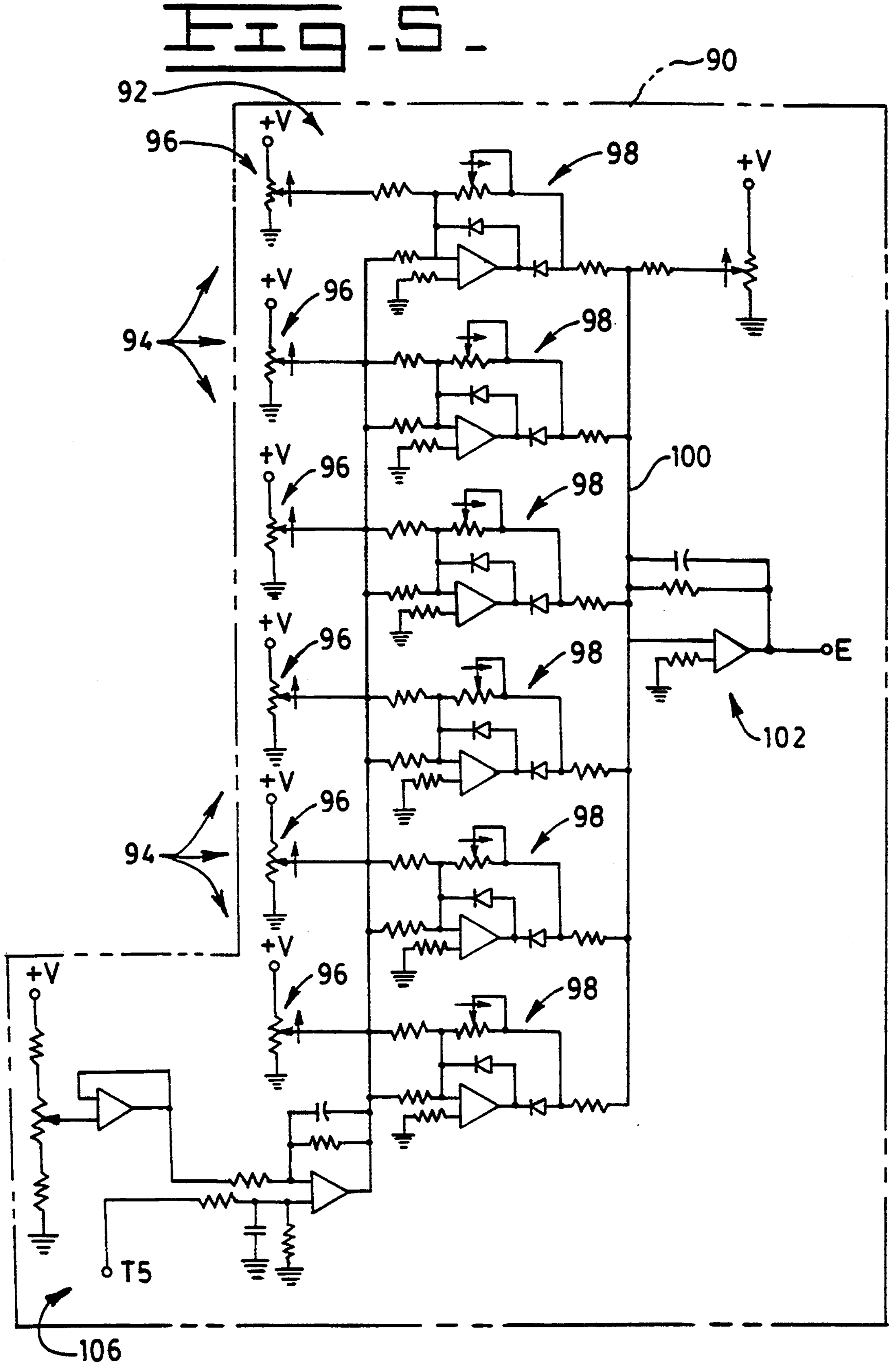
FIG. 5 is a diagrammatic electrical schematic circuit showing a function generator for generating a voltage related to a turbine life curve for a given power turbine inlet temperature.

Referring to FIGS. 1 and 5, The generating means 89 includes a curve or function generator 90 which is connected to receive the first signal from the temperature sensor 20. The curve generator 90 delivers a curve generator signal at a voltage related to the first signal (turbine inlet temperature) as established by the turbine equivalent life curve for the particular gas turbine engine 12 being monitored.

Figure 10:
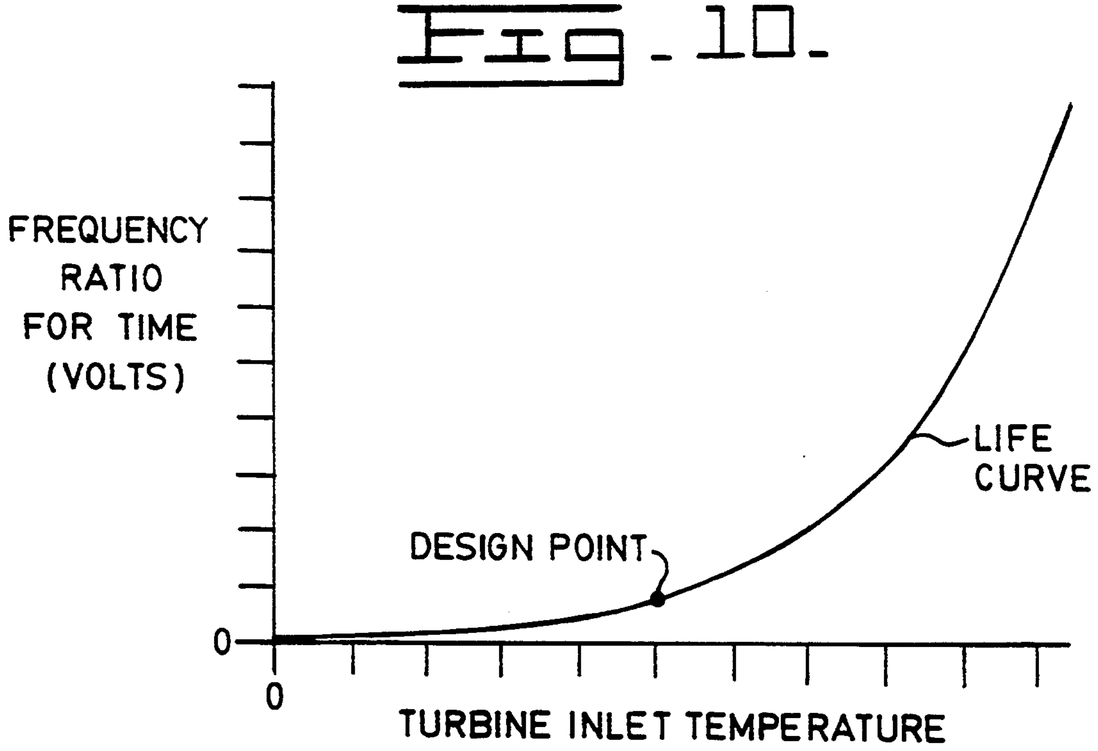
FIG. 10 shows a life curve for a representative gas turbine engine model having frequency ratio for time (voltage) and turbine inlet temperature coordinates.

A representative life curve is shown in FIG. 10. The life curve is based on the material behavior of the turbine blades and other parts under various temperatures and stresses. The cumulative effects of rupture and creep are calculated using the Larson-Miller theory. This data along with fatigue, blade alloys, blade temperatures and duty cycle are used in generating a curve that provides the frequency ratio for life as a function of turbine inlet temperature. The frequency ratio is plotted from 0.1 to 10 and the design point is taken at 1.

The Larson-Miller theory postulates that for each combination of material and stress level there exists a unique value of a parameter P that is related to temperature and time by the equation:

$$P=(\theta+460)\,(C+\mathrm{Log}_{10}t) \qquad \text{(Eq. 1)}$$

Where:

P=Larson-Miller parameter, constant for a given material and stress level $\theta$=temperature of C=constant depending on material (typically 15, 20 or 25)

t=time in hours to rupture or to reach specified value of creep strain

Gas turbine engines 12 seldom operate at a constant turbine inlet temperature throughout their life. Therefore, in order to obtain the equivalent life used, it is necessary to integrate the partial life fractions at many different operating temperatures over the total operating time of the gas turbine engine. At the present time there is no universally accepted method for estimating the creep or rupture strain accumulated as a result of exposure for various periods of time at different temperatures and stress levels. A linear hypothesis has been selected because of its accuracy in the temperature and stress range of interest.

For a linear hypothesis the cumulative effect is as follows:

$$\sum_{i=1}^{K} \frac{t_i}{L_i} = 1 \qquad \text{(Eq. 2)}$$

Where:

$t_i$=time of exposure at the $i_{tn}$ combination of stress and temperature $L_i$=time required to rupture if he entire exposure were held constant at the itn combination of stress level and temperature Two alternate methods of integrating (Eq. 2) over the operating "Real-Time" are:

(A) Sample at fixed intervals in time and compute cumulative damage.

(B) Vary the sampling interval so that each event constitutes an equal fraction of life "Used-Up".

For method "A" sampling at constant time interval can be represented by:

$$t_i=(1/f) \text{ Where } f=\text{frequency samples/hr.}$$

Whereas for method "B" accumulating equal life fractions can be represented by:

$$t_i/L_i=t_1/L_1=t_2/L_2=\text{constant}$$

For method "A", Eq. 2 becomes:

$$\sum_{i=1}^{k} \frac{1}{L_i} = f \qquad \text{(Eq. 3A)}$$

For method "B", Eq. 2 becomes:

$$\sum_{i=1}^{k} \frac{1}{f_i L_i} = 1 \qquad \text{(Eq. 3B)}$$

Or if N=total number of samples and all life fractions are the same:

$$\frac{N}{f_i L_i} = 1 \qquad \text{(Eq. 3B.1)}$$

For typical values using method "A":

$$\sum_{i=1}^{k} \frac{1}{L_i} = f$$

Eq. 1 for the itn term:

$$P_i=(\theta+460)\,(C+\mathrm{LOG}_{10}\,L_i) \qquad \text{(Eq. 4)}$$

Solving Eq. 4 for $L_i$ at design point:

$$L_i = 10\left(\frac{P_i}{\theta_i + 460} - C\right)$$

Multiplying the value for each sample $L_i/\int$ an equivalent hour will be a real hour at the design point temperature.

To accumulate equal life fractions and vary the sample rate, from (Eq. 3B.1):

$$\frac{N}{f_i L_i} = 1$$

$$\frac{1}{f_i L_i} = \frac{1}{f_D L_D}$$

$$f_i = \frac{f_D L_D}{L_i} = \frac{f_D L_D}{10^{\left(\frac{P}{\theta+460} - C\right)}}$$

$$\frac{f_i}{f_D} = \frac{10^{\left(\frac{P}{\theta_D+460} - C\right)}}{10^{\left(\frac{P}{\theta+460} - C\right)}}$$

$$= 10^{\left(\frac{P}{\theta_D+460} - \frac{P}{\theta_i+460}\right)}$$

$$= 10^{P\left(\frac{1}{\theta_D} - \frac{1}{\theta_i}\right)}$$

$$= 10^{P\left(\frac{\theta_i-\theta_D}{\theta_D\theta_i}\right)}$$

This ratio as a function of turbine inlet temperature is plotted on FIG. 10.

The life curve is divided into six segments and programmed into the curve generator 90 of the apparatus 10. The temperature of the turbine inlet (power turbine inlet in a two shaft turbine) is proportional to a voltage value delivered by the temperature sensor 20, for example, 0 to 1500 degrees (F=0 to 5 volts). Similarly, the curve generator delivers an output signal at a voltage related to the temperature of the gas turbine engine 12 as established by the turbine equivalent life curve for a given turbine temperature ($T_5$).

A schematic circuit of the curve generator 90 is shown in FIG. 5. The curve generator 90 includes a differencing amplifier 92 having six amplifier portions 94, one for each of the six segments of the life curve. Each amplifier portion 94 has an adjustment means 96, such as a potentiometer, for establishing the set point voltage at which each amplifier portion 94 turns on. Each amplifier portion 94 has an adjustment means 98, such as a potentiometer, for setting the slope of the related segment of the curve. The output of each of the six amplifier portions 94 are connected to a summing junction 100 of a summing amplifier 102.

The sensing means 20 is connected to an input amplifier 106 of the curve generator 90. The first signal is passed at one of a plurality of voltages of a predetermined range of voltages representing one of a plurality of temperatures of a predetermined range of temperatures to the amplifier 92. The amplifier 92 based on the voltage of the first signal received delivers an output voltage within a different range of voltages received. For example, a $T_5$ temperature of 0–1500 degrees Fahrenheit will be represented by a range of voltages between 0–5 at the input to the generator 90. These same voltages will be represented by a voltage range of between 0.1 and 10 volts at the output of the generator 90.

Figure 7:
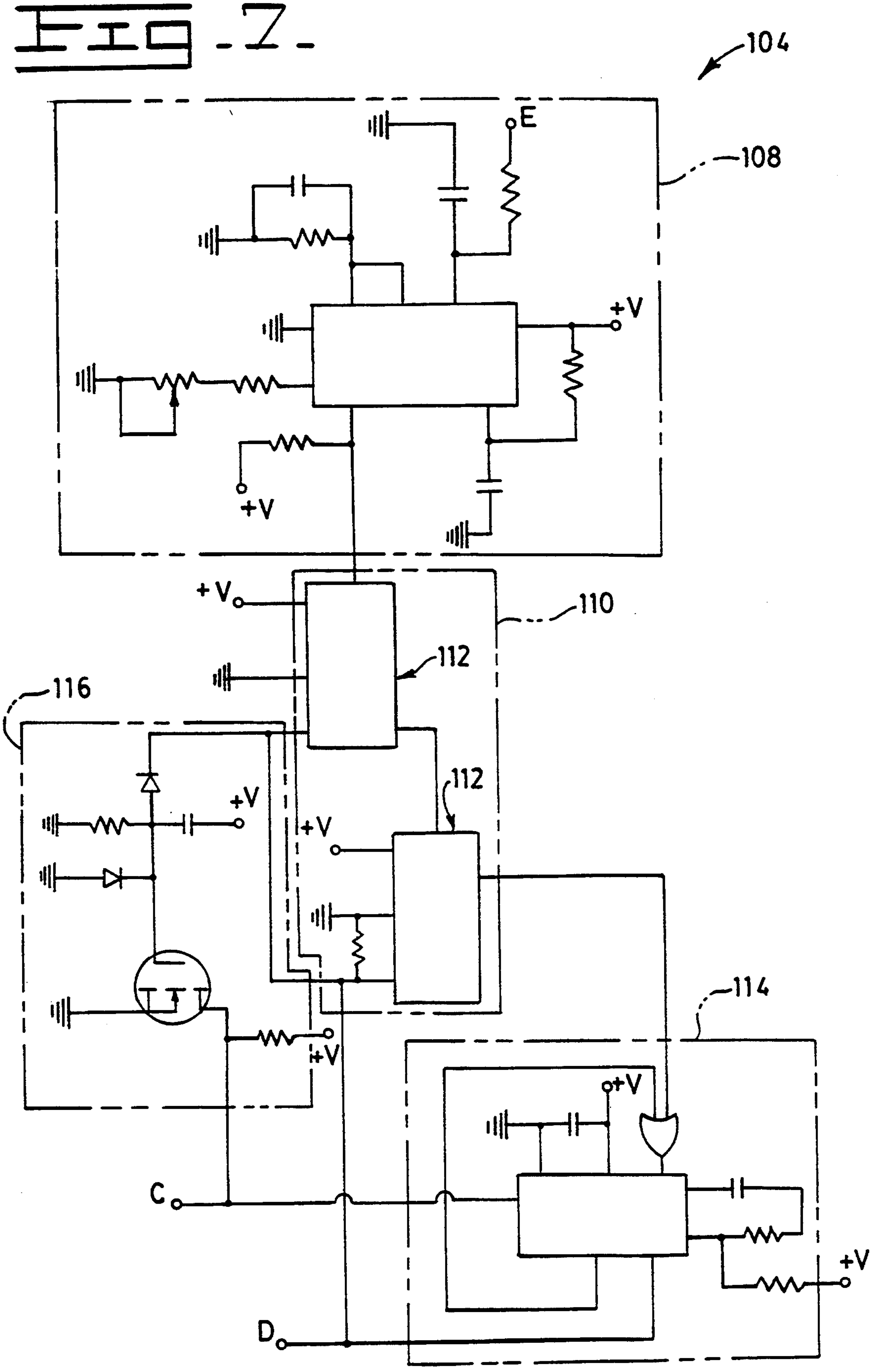
FIG. 7 is a diagrammatic electrical schematic circuit showing another portion of the apparatus of FIG. 1 in greater detail.

Referring to FIGS. 1 and 7, the amplified output of the generator 90 is directed to a means 104 for converting the voltage to a frequency and delivering a pulse in response to the frequency count totaling a predetermined number. The means 104 includes a voltage to frequency converter means 108 and a counter means 110 both of a conventional construction. Details of the construction of the converter means 108 and the counter means 110 are shown in substantial detail in FIG. 7. The curve generator 90 is connected to the voltage to frequency converter means 108 and the voltage to frequency converter means 108 is connected to the counter 11. The converter means 108 delivers a pulse train at a frequency proportional to voltage received from the generator 90. For example, an output signal of 0–10 volts from the generator 90 will result in an output signal of 0–11,650 Hz from the converter 108.

The counter means 110, which includes a pair of serially connected counters 112, receives the pulse train and delivers a pulse in response to the pulse frequency count totaling a predetermined number. For example, when the count reaches 1165 pulses, the equivalent of one equivalent life hour, the counter 110 delivers a single pulse.

The means 104 also includes a flip flop 114, of conventional design. The flip flop 114 is connected to the counter means 110 and receives the pulse delivered from the counter means 110. The flip flop 114, which is connected to the life recorder 32, advances the life recorder a predetermined amount for each pulse received. As in the case above, the flip flop 114 will deliver a pulse of a duration adequate to cause the life recorder 32 to advance one life hour. The pulse is delivered to the gate of FET 80 (FIG. 6) which causes the transistor 80 to connect V+ of the phototransistor 36 to ground and activate the life recorder, as described in some detail above. This results in the advancement of the life recorder 32 an amount determined by the duration of the pulse delivered by the flip flop 114.

As shown in FIG. 7, a reset means 116 is provided for resetting the counting means 110 to zero (0) at power turn on and after the life recorder has been incremented and prior to the counting means 110 beginning a new count sequence. Reset means 116 of the type shown in this FIG. are well known in the art and will therefore not be discussed in any greater detail.

Referring to FIG. 8, in this embodiment of the apparatus 10, the turbine temperature ($T_5$) and starter drop out are sensed in the same manner as described above. The temperature and starter drop out signals are delivered to the processor 48 and executed substantially in accordance with the steps set forth in FIG. 9. It is to be noted that these steps also pertain to the embodiment as shown in FIG. 1. Based on the executed steps and the above noted calculations, the equivalent life and run time values are recorded. As indicated above recorded in this context includes being displayed. In the preferred embodiment the run time and equivalent life values are displayed numerically.

Figure 9:
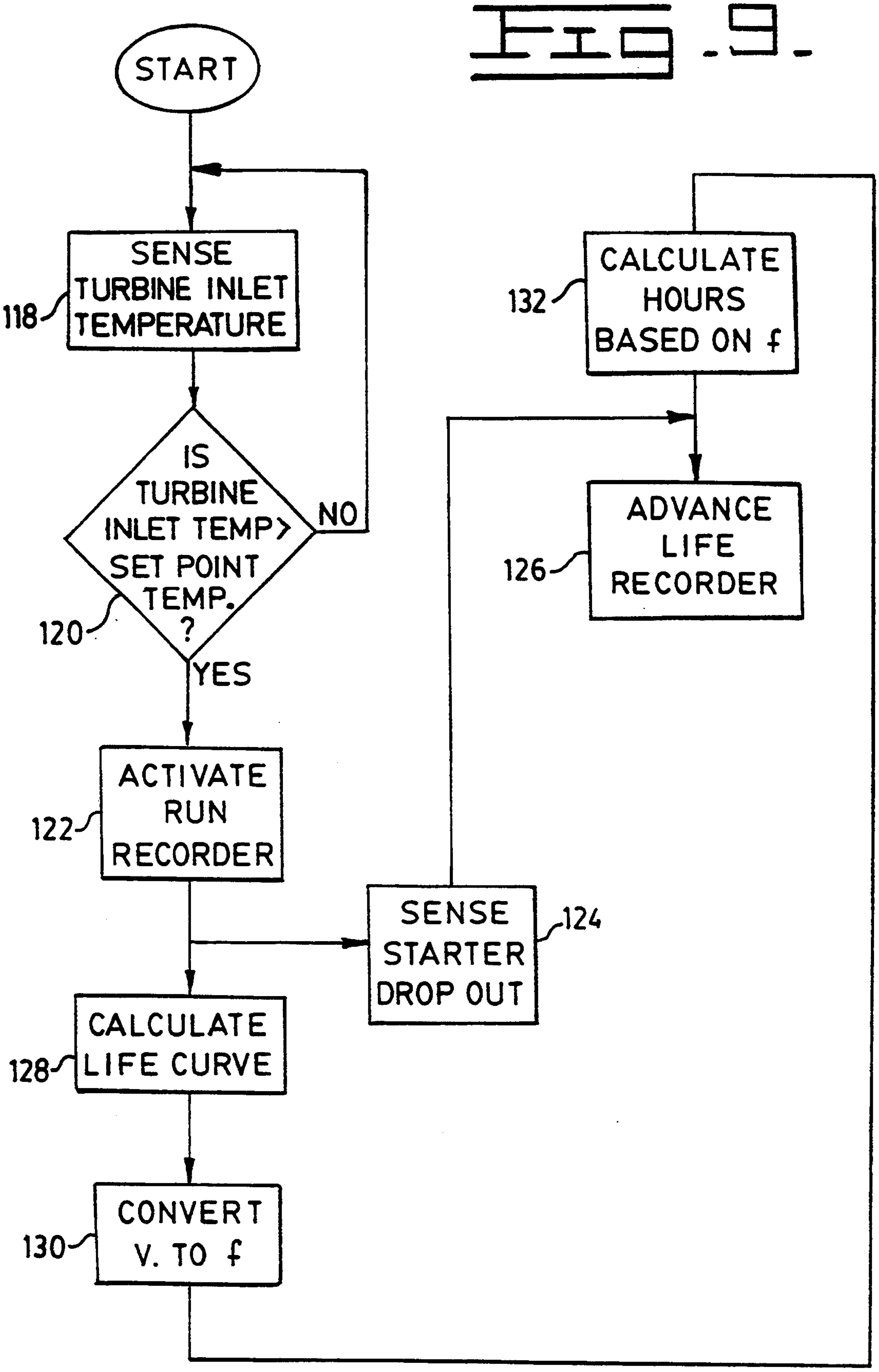
FIG. 9 shows a flow chart depicting the logical steps carried out by the apparatus for determining the equivalent life and run time of a gas turbine engine and displaying both equivalent life and run time.

Referring to FIG. 9, a method for determining the equivalent life and run time of a gas turbine engine 10 is shown. In block 118 the temperature of the turbine inlet is sensed, the representative voltage is converted to a digital signal, and the digital signal is delivered to the processor 48.

In logic block 120, the sensed turbine temperature is compared to the set point or predetermined temperature. If the measured turbine temperature is less than or equal to the set point temperature the test fails and the steps of block 118 and 120 are reexecuted in that order. Should the test pass, the sensed turbine temperature is greater than the set point temperature, a run signal is delivered to the run recorder means 42 and the run recorder means 42 is activated as indicated in block 122. In this regard the run recorder means 42, may be continuously updated in realtime or at the completion of a fixed time period. In the preferred embodiment, the digital display 44 of the run recording means 42 will advance one hour for each hour of operation of the gas turbine engine 12.

As shown in block 124, the dropping out of the electric starting motor 14 is sensed. Starter drop out is based on a signal delivered from the starter dropout sensing means 24. The starter drop out signal is delivered to the processor 48. As discussed above, for each completed start of the particular gas turbine engine there is a predetermined amount of reduction in the life of the gas turbine engine based on at least the linear prediction constant. As indicated in block 126, the processor 48, based on the starter drop out signal and the already passed turbine temperature test, delivers a signal to the life recorder 32 and advances the life recorder the predetermined amount. As indicated, it is necessary to meet both turbine set point temperature and starter drop out conditions in order to have a valid gas turbine engine start for the purpose of advancing the life recorder 32.

As shown in blocks 128, 130, and 132, in order to advance the life recorder 32 based solely on turbine inlet temperature it is necessary to determine the equivalent life value for the particular gas turbine engine 12 at the measured turbine inlet temperature. As indicated earlier and shown in FIG. 10, there is a unique turbine life curve for each turbine model. The turbine life curve (or data representing the life curve) is calculated and stored in the processor 48 (or produced by the curve generator 90). The life curve shown represents the frequency ratio for time measured in volts with respect to turbine inlet temperature for the particular gas turbine engine and enables advancement of the life recorder based on this information. The voltage is converted to a frequency, in block 130, and the life hours are calculated in block 132 based on the frequency conversion. The processor 48 determines in real time the equivalent life for the sensed turbine temperature based on the equivalent life curve information and delivers a signal to advance the life recorder 32 a corresponding amount. The life recorder 32 responds to this signal, as indicated in block 126, and advances the life recorder.

Industrial Applicability

With reference to the drawings, particularly FIGS. 1 and 8, the turbine run recording means 42 is activated in response to the set point temperature of the turbine inlet temperature $T_5$, a reliably measured temperature, being greater than a set point temperature. As indicated earlier, a turbine engine start for run recorder advancement purposes is presumed when the temperature of the turbine inlet is greater than the set point temperature. Upon meeting this condition (FIG. 1) the switching means 52 is actuated which enables the counters 56, 82 and advances the run recorder 42 one hour for each hour that the turbine inlet temperature is greater than set point temperature. Regarding FIG. 8, the processor 46 makes the temperature comparison and advances the run recorder 42 one hour for each hour of operation of the gas turbine engine 12.

The life recorder 32 is also advanced a predetermined number of life hours for each completed turbine engine 12 start. As previously discussed, the number of life hours for each successfully completed start is based on the linear prediction curve of FIG. 11. A completed start in this sense requires that both starter dropout and setpoint temperature conditions have been met. As shown in the circuit schematic of FIG. 1, the logic gate 74 passes a signal to flip flop 76 to advance the life recorder when both conditions are met. The same logic is used in the embodiment of FIG. 8. The processor 46, based on signals from the temperature sensing means 20 and the starter drop out sensing means 24, advances the life recorder an equal amount, as a function of the linear failure prediction curve of FIG. 11.

The life recorder 32 is also controlled as a function of turbine inlet temperature ($T_5$). As indicated earlier and shown in FIG. 10, for each turbine engine model and type there is a representative turbine life curve having turbine inlet temperature ($T_5$) and voltage coordinates. As shown in FIG. 1, the curve generator 90 delivers a voltage signal based on the turbine life curve and the measured turbine inlet temperature ($T_5$). The voltage signal is received by means 104 which converts the voltage to a frequency, counts the number of pulses, and delivers a signal (pulse) to the life recorder 32. For example, a signal of 11,650 Hz for 1 hour of operation produces 10 pulses and advances the life recorder 10 life hours.

In the embodiment of FIG. 8, the turbine life curve or equivalent data is stored in the programmable computer 48 of the signal receiving means 46. The programmable computer 48, based on the received inlet temperature ($T_5$), generates a pulse for each life hour of operation. The life recorder 32 receives this pulse and advances one life hour for each pulse received.

Other aspects, objects and advantages of the present invention can be obtained from a study of the drawings, the disclosure and the appended claims.

We claim:

1. An apparatus for determining the equivalent life of a gas turbine engine having a source of electrical energy, and a starting motor; comprising:

means for sensing a temperature of said gas turbine engine and responsively delivering a first signal;

means for sensing starting motor drop out and delivering a responsive second signal;

means for recording a value related to the equivalent life of the gas turbine engine, and means for receiving said first and second signals and changing the recorded equivalent life value a predetermined amount in response to receiving said second signal and in response to the sensed temperature being greater than a predetermined value, said receiving means being connected to said life recording, temperature sensing, and starting motor drop out sensing means.

2. An apparatus, as set forth in claim 1, wherein said life recording means includes means for displaying a numerical value related to the recorded equivalent life value.

3. An apparatus, as set forth in claim 1, wherein said predetermined amount of change in the recorded equivalent life value of the gas turbine engine for a completed engine start being a function of a linear prediction constant based on the following equation:

$$\sum_{J=1}^{N} \sum_{i=1}^{k} \frac{t_i}{L_i} + \frac{C_J}{N_J} = 1$$

$t_i$=time of exposure at the $i_{th}$ combination of stress and temperature, $L_i$=time required to rupture if the entire exposure were held constant at the $i_{th}$ combination of stress level and temperature, $C_J$=number of cycles at stress level J, $N_J$=number of cycles to fail at stress level J.

4. An apparatus, as set forth in claim 1, wherein said turbine engine having a turbine inlet, said sensed temperature being the temperature at the turbine inlet, and including generating means for receiving said first signal and changing said recorded equivalent life value an amount based on a predetermined turbine equivalent life curve having an equivalent life value being a function of turbine inlet temperature.

5. An apparatus, as set forth in claim 4, wherein said generating means including:

a curve generator connected to the temperature sensing means and being adapted receive said first signal, said curve generator delivering a signal at a voltage related to the turbine inlet temperature as established by the equivalent life curve;

means for converting the voltage to a frequency and delivering a pulse in response to the frequency count totaling a predetermined number;

said life recording means receiving said pulse and advancing said equivalent life value a predetermined amount for each pulse received.

6. An apparatus, as set forth in claim 4, including, run recording means for recording a run value related to the number of run hours of the gas turbine engine, said run recording means advancing the recorded run value a value related to one hour for each hour the sensed temperature is greater than a predetermined set temperature.

7. An apparatus, as set forth in claim 6, wherein said run recording means including, means for displaying a numerical value related to a number of run hours of the gas turbine engine.

8. An apparatus, as set forth in claim 1, including means for displaying a value related to the number of run hours of the gas turbine engine, said signal receiving means including:

a processing means having a memory and being connected to said temperature sensing means, starter drop out sensing means, run recording means, and equivalent life recording means, said processing means receiving said first signal and delivering a run signal in response to said turbine temperature being greater in magnitude than a predetermined value, said run displaying means advancing one hour for each hour the turbine temperature is greater than said predetermined temperature; and said processing means determining for the sensed temperature a corresponding equivalent life value related to the operating life of the gas turbine engine based on an equivalent life curve having voltage to temperature coordinates and advancing the life recording means said corresponding equivalent life value.

9. An apparatus, as set forth in claim 8, wherein said processor converting said voltage to frequency and said frequency to said equivalent life value, said equivalent life value representing equivalent life hours of the gas turbine engine.

10. An apparatus, as set forth in claim 1, wherein said receiving means including:

clock means for delivering an oscillating signal at a predetermined frequency;

counting means for receiving said oscillating signal and responsively delivering a count signal;

switching means connected to and between said clock and counting means, said switching means being actuatable between an open condition at which said oscillating signal is blocked and a closed condition at which said oscillating signal is deliverable to said counting means; and comparing means for comparing the first signal to a predetermined set point value and delivering a control signal to said switching means in response to said first signal being greater than said predetermined set point value, said switching means being actuated to the closed condition in response to receiving said control signal, said stitching means passing said oscillating signal to said counting means at the closed condition, said counting means passing said count signal in response to receiving said oscillating signal, said comparing means being connected to and between said temperature sensing means and said switching means.

11. An apparatus, as set forth in claim 10, wherein said starter drop out sensing means including a relay having first and second positions and being movable between said first and second positions, said relay being at said first position in response to said starter being enabled and at the second position in response to said starter dropping out, said relay delivering said second signal at said second position.

12. An apparatus, as set forth in claim 11, a curve generator connected to the temperature sensing means and being adapted receive said first signal, said curve generator delivering a signal at a voltage related to the turbine temperature as established by the equivalent life curve; and means for converting the voltage to a frequency and delivering a pulse in response to the frequency count totaling a predetermined number, said life recording means receiving said pulse and changing said equivalent life value a predetermined amount in response to receiving said pulse.

13. An apparatus, as set forth in claim 12, including;

means for receiving said count signal and delivering a pulse in response to the count signal being equivalent to an hour of run time; and means for displaying a numerical value related to the number of run hours of the gas turbine engine, said run recording means receiving said pulse and responsively advancing said displaying means a value equal to one run hour.

14. An apparatus, as set forth in claim 11, wherein said receiving means including logic means for receiving said count and second signals and delivering a pulse in response to receiving said count and second signals, said life recording means increasing the equivalent life value a predetermined amount in response to the delivery of said pulse.

15. An apparatus, as set forth in claim 14, wherein said logic means includes means for modulating the width of the logic means delivered pulse and changing the equivalent life value for a completed turbine engine start.

16. An apparatus, as set forth in claim 1, wherein said starter drop out sensing means including a relay having first and second positions and being movable between said first and second positions, said relay being at said first position in response to said starter being enabled and at the second position in response to said starter dropping out, said relay delivering said second signal at said second position.

17. A method for determining the equivalent life of a gas turbine engine having a turbine inlet, comprising the steps of:

sensing the inlet temperature of the turbine;

calculating an equivalent life curve as a function of turbine inlet temperature; and advancing a life recorder a predetermined amount based on said equivalent life curve and the sensed turbine inlet temperature;

comparing the sensed turbine inlet temperature with a predetermined temperature;

sensing a dropping out of a turbine engine starting motor; and advancing the life recorder a predetermined amount in response to said starter dropping out and said sensed turbine inlet temperature being greater than said predetermined temperature.

18. A method, as set forth in claim 17 including the steps of:

comparing the sensed turbine inlet temperature with a predetermined temperature; and passing a run signal in response to the sensed temperature turbine inlet being greater than the predetermined temperature.

19. A method, as set forth in claim 17 including the steps of:

comparing the sensed turbine inlet temperature with a predetermined temperature; and passing a run recorder signal in response to said sensed turbine inlet temperature being greater than said predetermined temperature.

20. A method, as set forth in claim 17, including the steps of:

delivering a voltage as a function of the sensed turbine inlet temperature and the equivalent life curve;

converting the voltage to frequency;

calculating the equivalent life value based on frequency; and advancing the life recorder the calculated equivalent life value.

* * * * *